United States Patent [19]

Seefeldt et al.

[11] Patent Number: 5,043,235
[45] Date of Patent: Aug. 27, 1991

[54] GALVANIC BATTERY

[75] Inventors: Volker Seefeldt, Ellwangen-Neunheim; Thomas Apprich, Aalan, both of Fed. Rep. of Germany

[73] Assignee: Varta Batterie Aktiengesellschaft, Hannover, Fed. Rep. of Germany

[21] Appl. No.: 545,276

[22] Filed: Jun. 28, 1990

[30] Foreign Application Priority Data

Jul. 10, 1989 [DE] Fed. Rep. of Germany ....... 3922596

[51] Int. Cl.⁵ .................... H01M 2/22; H01M 6/10
[52] U.S. Cl. .................................... 429/94; 429/122
[58] Field of Search ................ 429/94, 122, 170, 178, 429/164

[56] References Cited

U.S. PATENT DOCUMENTS

| 3,257,238 | 6/1966 | Andre | 429/94 |
| 4,053,687 | 10/1977 | Coibion et al. | 429/94 |
| 4,091,178 | 5/1978 | Kordesch | 429/60 |
| 4,259,416 | 3/1981 | Ikeda et al. | 429/94 |
| 4,332,867 | 6/1982 | Tsuda et al. | 429/94 |
| 4,788,112 | 11/1988 | Kung | 429/54 |

Primary Examiner—Anthony Skapars
Attorney, Agent, or Firm—Weiser & Stapler

[57] ABSTRACT

A galvanic battery having band-shaped positive and negative electrodes, and an intermediate band-shaped separator, which are helically wound to develop an electrode structure for mounting within a cylindrical housing having a cell pole sealed and insulated against the housing, includes a connecting element which electrically bridges the gap between the cell pole and the edge of the corresponding electrode band and which is comprised of a contact plate having a branched contact clamp concentrically welded to it, an insulation plate positioned over the contact plate and having a centrally disposed aperture for receiving the branched contact clamp, and a pressure spring placed over the insulation plate so that the contact plate presses on the exposed edge of the corresponding electrode band under the influence of the pressure spring, and so that the cell pole is received within the branched contact clamp. The connecting element is suitable for pre-assembly outside of the cell, for final placement within the cell without a welding step.

12 Claims, 2 Drawing Sheets

GALVANIC BATTERY

BACKGROUND OF THE INVENTION

The present invention generally pertains to a galvanic battery with band-shaped positive and negative electrodes, and an intermediate band-shaped separator, which are helically wound to develop an electrode structure for mounting within a cylindrical housing having a cell pole which is insulated and sealed against the housing, and a connecting element which electrically bridges the gap between the cell pole and the edge of the corresponding band electrode.

The present invention is preferably applicable to lithium cells, but is also applicable to Ni/Cd storage batteries in round cell form (e.g., with wound sintered-foil electrodes). In winding cells of this type, the electrode band of one polarity is generally made somewhat longer than the electrode band of the other polarity so that the former can develop the outermost end of the spiral winding and can be brought into direct contact with the inner wall of the cell housing. As a rule, the outermost spiral winding constitutes the negative electrode, and consequently, the cell housing serves as the negative pole for the assembled cell.

In contrast, the remaining electrode band (of the other polarity) must be connected to the corresponding cell pole, which generally takes the form of a metal button recessed in the cell cover and which is insulated from the cover, a flanged cap, or a metallic cell cover. In either case, a connecting element is required to bridge the distance between the cell pole and the corresponding electrode. For example, as disclosed in DE-PS 30 14 435, a coil spring can be used as this connecting element, to place the collector rod of a wound lithium electrode in contact with a metallic housing cover (developing a negative cell pole).

Yet another approach is to weld a lug to an exposed edge (active mass removed) of the band electrode. In the course of assembling such a cell, this lug must be positioned for connection (e.g., by resistance welding) to the corresponding cell pole. However, with even the shortest distance between the cell pole and the connecting lug, a flexible intermediate connection cannot be used due to limitations of the welding process, and in assembly of the cell, complicating manufacture. The dense alkaline cell disclosed in U.S. Pat. No. 3,579,387 is one example of this.

Conductor lugs of this general type also tend to interfere with winding of the electrode, and to reduce the capacity of the winding machine. What is more, the conductor lug which is then projecting upwardly from the cell housing tends to interfere with electrolyte dosing under vacuum since the cell is then often poorly sealed. In addition, such conductor lugs can tend to inhibit prevailing automated production processes.

In connection with the manufacture of wound lithium cells, there are added problems since in such case the conductor lug is preferably rather long, to allow for the fan-fold which is preferred, and because the welding of the conductor lug must be carried out in an inert (argon) environment.

SUMMARY OF THE INVENTION

It is therefore the primary object of the present invention to provide a wound-cell-type galvanic battery in which the electrical connection between the cell's external contact (cell pole) and the electrode band of corresponding polarity is developed more simply, and in an manner more conducive to existing assembly processes, so that production of the cell can be more easily incorporated into the existing production flow.

This and other objects are achieved according to the present invention by providing a galvanic battery having bandshaped positive and negative electrodes, and an intermediate band-shaped separator, which are helically wound to develop an electrode structure for mounting within a cylindrical housing having a cell pole sealed and insulated against the housing, and a connecting element which electrically bridges the gap between the cell pole and the edge of the corresponding electrode band and which is comprised of a contact plate having a branched contact clamp concentrically welded to it, an insulation plate positioned over the contact plate and having a centrally disposed aperture for receiving the branched contact clamp, and a pressure spring placed over the insulation plate so that the contact plate presses on the exposed edge of the corresponding electrode band under the influence of the pressure spring, and so that the cell pole is received within the branched contact clamp.

The present invention is particularly advantageous in that for the electrical connection of the cell pole to its corresponding electrode, generally the positive electrode, a connecting element is provided which can be pre-assembled outside of the cell, for final placement within the cell without a welding step. What is more, the corresponding electrode band no longer needs to be fitted with either a collector rod or a lug conductor, eliminating the above-mentioned obstacles to the winding process and electrolyte dosing.

Further detail regarding a connecting element produced according to the present invention is provided below, taken in conjunction with the following illustrations.

BRIEF DESCRIPTION OF THE DRAWINGS

In the several views provided, like reference numbers denote similar structures.

DETAILED DESCRIPTION OF THE PREFERRED EMBODIMENT

Figure 1:
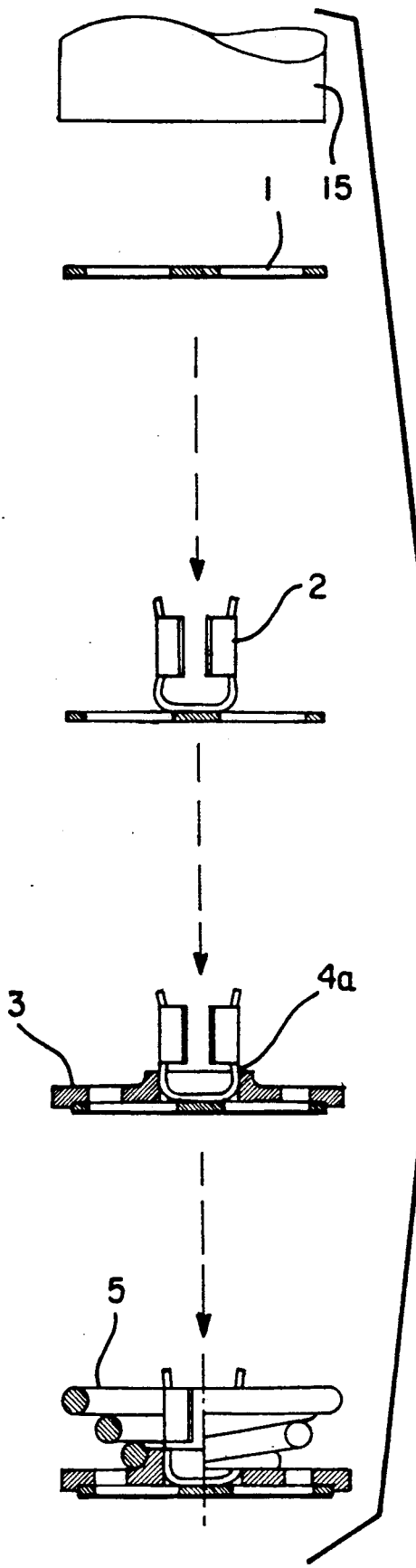
FIG. 1 schematically shows the pre-assembly of the connecting element of the present invention.
Figure 2A:
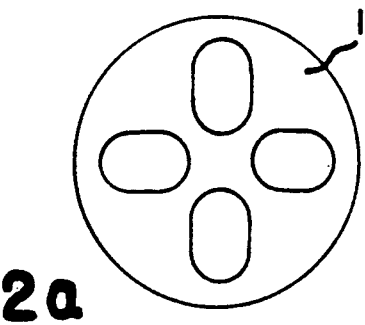
FIGS. 2a to 2g separately show the components of the connecting element, prior to their pre-assembly.
Figure 2B:
Figure 2C:
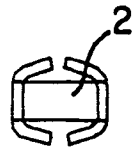
Figure 2D:
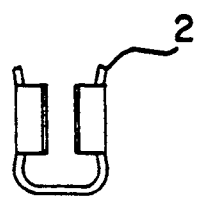
Figure 2E:
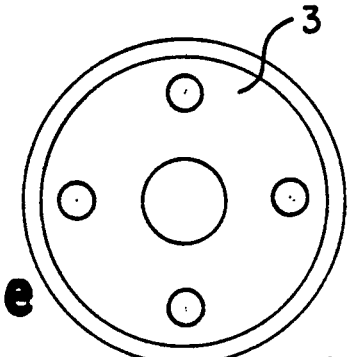
Figure 2F:
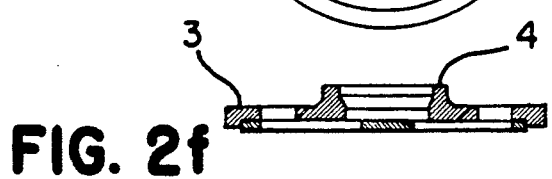
Figure 2G:
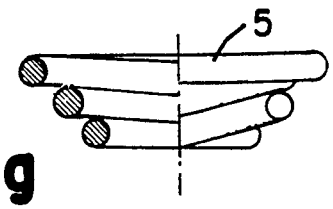

Referring now to FIGS. 1 and 2, a branched contact clamp 2 is concentrically welded onto a configured contact plate 1 (preferably formed of V2A steel). An insulation plate 3 (preferably made of polypropylene by injection molding) is then pressed onto the contact plate 1. The insulation plate 3 includes a collar 4 defining an aperture for receiving the contact clamp 2 welded to the contact plate 1. To provide a more solid mounting, the interlocking parts of the insulation plate 3 and of the contact clamp 2 are further preferably provided with a snap-fit design. Finally, a helical cone-shaped spring 5 is pressed onto the collar 4. The collar 4 is preferably configured so that the cone spring 5 is held in position by means of an elastic undercut 4a. At the same time, the collar 4 serves to This then completes the pre-assembly of the connecting element. To be noted is that this procedure can take place separately from final assembly of the cell, as will now be described with reference to FIGS. 1 and 3 of the drawings.

Prior to final assembly, the cell housing 6 is fitted with the wound electrode, which is generally comprised of an anode band 8, a cathode band 9 and an intermediate separator 10. An insulation mat 7 further separates the bottom of the cell housing 6 from the wound electrode. To be noted is that the electrode winding is arranged such that at least the upper (front) edge of the electrode band (in this case the positive electrode 8) which faces toward the cover and which should be in contact with the external cell pole (and which ordinarily forms the inside of the coiled winding), extends above the upper (front) edge of the other electrode band (in this case the negative electrode 9).

The pre-assembled connecting element, and in turn a beading mandrel 15 (i.e., a cylindrical die having a diameter which is somewhat smaller than the inner diameter of the vessel) are then inserted, from above, into the open cell housing 6 so that the contact plate 1 of the connecting element is pressed onto the edge projecting from the corresponding band electrode, in this case the edge of the anode band 8, and so that the helical cone spring 5 is simultaneously compressed. The beading mandrel then forms an abutment for a beading wheel rotating on the outside of the cell housing, which engraves a bead 11 into the cell housing 6 at a position directly above the compressed spring 5. The spring 5, which is then retained and supported within the cell housing 6 against the bead 11, remains in compression as a result of this construction.

Final assembly of the galvanic battery is then accomplished in otherwise conventional fashion. For example, electrolyte filling is accomplished with a vacuum dosing head, which seals the cell (with its sealing element) against the bead 11. This is then followed by proper placement of the cell cover, and sealing of the cell, preferably by welding the assembly using a laser. To be noted is that if the galvanic battery is a lithium cell, such final assembly steps must be carried out in an inert environment, preferably filled with argon.

Figure 3:
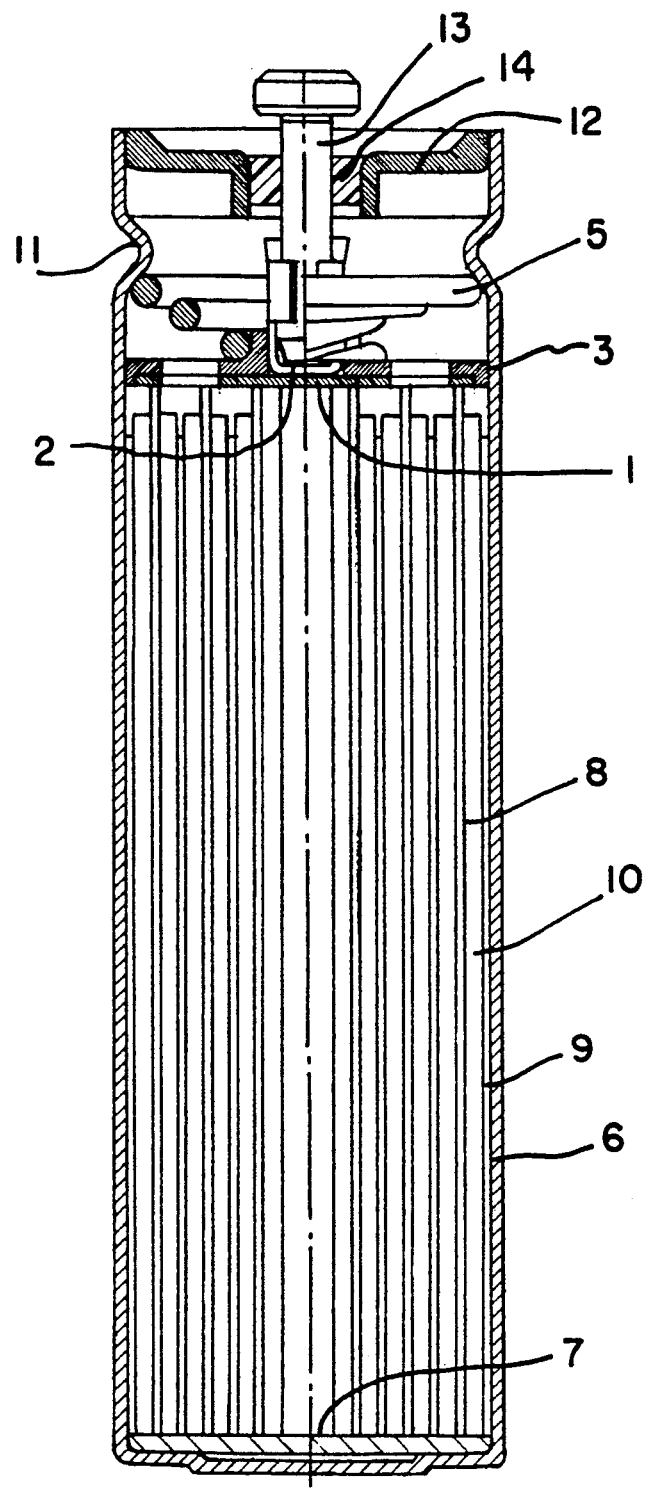
FIG. 3 shows an assembled cell which is provided with the connecting element of FIGS. 1 and 2.

As is best illustrated in FIG. 3, the battery's cover, which can be pre-assembled under normal environmental conditions, generally includes a metallic flanged cap 12 having a central opening for receiving the cell's pole or electrical contact 13 through an opening in a seal 14 for completing the unit. When assembling the cover, the cell pole 13 is pushed into the branched contact clamp 2, much as a plug, conveniently developing the necessary electrical connection to the (positive) band electrode 8.

Since all of the parts to be assembled are rotationally symmetrical, a careful positioning of the several elements involved is not necessary. This favors automated production, even at high cycle rates. What is more, no welding operation is needed during actual assembly of the cell, and the cover-to-container zone to be subsequently welded (with a laser) is not wetted with electrolyte from the electrolyte dosing process. Insofar as these production steps must be carried out in an inert gas atmosphere, this remains limited to cells with air-sensitive active components such as wound lithium cells.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. For a galvanic battery with band-shaped positive and negative electrodes and an intermediate band-shaped separator which are helically wound to develop an electrode structure for placement within a cylindrical housing having a cell pole sealed and insulated against the housing, a connecting element for electrically connecting the cell pole and an edge of a corresponding electrode band comprising a contact plate, a branched contact clamp for receiving the cell pole and concentrically welded to the contact plate, an insulation plate positioned over the contact plate and having a centrally disposed aperture for receiving the branched contact clamp, and a pressure spring placed over the insulation plate for pressing the contact plate against the edge of the corresponding electrode band under forces of the pressure spring.

2. The connecting element of claim 1 wherein the corresponding electrode band is a positive electrode.

3. The connecting element of claim 1 wherein the contact plate is formed of steel.

4. The connecting element of claim 1 wherein the insulation plate is formed of polypropylene.

5. The connecting element of claim 1 wherein the insulation plate includes a collar for defining the aperture for receiving the branched contact clamp.

6. The connecting element of claim 5 wherein the collar further includes an elastic undercut for receiving portions of the pressure spring.

7. The connecting element of claim 1 wherein the pressure spring is formed as a generally cone-shaped helix.

8. A galvanic battery having band-shaped positive and negative electrodes and an intermediate band-shaped separator which are helically wound to develop an electrode structure for placement within a cylindrical housing having a cell pole sealed and insulated against the housing, and a connecting element for electrically connecting the cell pole and an edge of a corresponding electrode band comprising a contact plate, a branched contact clamp concentrically welded to the contact plate, an insulation plate positioned over the contact plate and having a centrally disposed aperture for receiving the branched contact clamp, and a pressure spring placed over the insulation plate so that the contact plate presses on the edge of the corresponding electrode band under forces of the pressure spring, wherein the cell pole is received within the branched contact clamp.

9. The galvanic battery of claim 8 wherein the corresponding electrode band is a positive electrode.

10. The galvanic battery of claim 8 wherein the galvanic battery is a wound lithium battery.

11. The galvanic battery of claim 8 wherein the cell housing includes an inwardly directed seam for receiving and supporting portions of the pressure spring.

12. The galvanic battery of claim 8 wherein the edge of the corresponding electrode band extends beyond the corresponding edge of an electrode band of opposite polarity, for engaging the contact plate of the connecting element.

* * * * *